(12) United States Patent
Sinha et al.

(10) Patent No.: US 11,093,957 B2
(45) Date of Patent: Aug. 17, 2021

(54) TECHNIQUES TO QUANTIFY EFFECTIVENESS OF SITE-WIDE ACTIONS

(71) Applicant: Adobe Inc., San Jose, CA (US)

(72) Inventors: Atanu R. Sinha, Bangalore (IN); Meghanath Macha Yadagiri, Pittsburgh, PA (US); Pranav Ravindra Maneriker, Bangalore (IN); Sopan Khosla, Bangalore (IN); Avani Samdariya, Rewa (IN); Navjot Singh, Chandigarh (IN)

(73) Assignee: Adobe Inc., San Jose, CA (US)

( * ) Notice: Subject to any disclaimer, the term of this patent is extended or adjusted under 35 U.S.C. 154(b) by 406 days.

(21) Appl. No.: 15/819,808

(22) Filed: Nov. 21, 2017

(65) Prior Publication Data
US 2019/0156359 A1 May 23, 2019

(51) Int. Cl.
*G06Q 30/02* (2012.01)
*G06Q 10/06* (2012.01)

(52) U.S. Cl.
CPC ... *G06Q 30/0204* (2013.01); *G06Q 10/06393* (2013.01)

(58) Field of Classification Search
CPC ............... G06Q 10/06393; G06Q 30/0204
See application file for complete search history.

(56) References Cited

U.S. PATENT DOCUMENTS

| | | | | |
|---|---|---|---|---|
| 4,331,973 | A * | 5/1982 | Eskin | G06Q 30/02 348/E7.07 |
| 2003/0014304 | A1* | 1/2003 | Calvert | G06Q 30/02 705/14.42 |
| 2008/0177600 | A1* | 7/2008 | McCarthy | G06Q 10/0639 705/7.33 |
| 2009/0248494 | A1* | 10/2009 | Hueter | G06Q 30/0204 705/7.29 |
| 2012/0278158 | A1* | 11/2012 | Farahat | G06Q 30/0241 705/14.41 |
| 2014/0101685 | A1* | 4/2014 | Kitts | H04N 21/44213 725/14 |
| 2016/0026640 | A1* | 1/2016 | Hart | G06Q 30/02 707/751 |

(Continued)

OTHER PUBLICATIONS

Machine learning for targeted display advertising: transfer learning in action; Perlich et al; 2014 (Year: 2014).*

(Continued)

*Primary Examiner* — Deirdre D Hatcher
(74) *Attorney, Agent, or Firm* — Finch & Maloney PLLC

(57) ABSTRACT

Modifications to the DiD technique are disclosed which provide an estimate of the effectiveness of a site-wide action where no control group exists within the data subsequent to implementation of the site-wide action. In some examples, a method may include identifying a treatment group based on a modified treatment period, selecting a control group from a control period prior to the modified treatment period, and performing a modified difference-in-differences (DiD) estimation for a metric based on the modified treatment period, the treatment group, the control period, and the control group. The modified treatment period may encompass an intervention of a site-wide action, and include a pre-intervention time period and a post-intervention time period.

19 Claims, 9 Drawing Sheets

(56) References Cited

U.S. PATENT DOCUMENTS

2016/0034468 A1* 2/2016 Hart .................. G06F 11/3696
707/751
2018/0240036 A1* 8/2018 Boada .................. G06Q 30/02

OTHER PUBLICATIONS

Calinski, Tadeusz and Jerzy Harabasz, "A dendrite method for cluster analysis", Jan. 1974, Communications in Statistics-theory and Methods, 27 pages.
Sculley, David, "Web-scale k-means clustering", 2010, In Proceedings of the 19th international conference on World wide web, 2 pages.
Imbens/Wooldridge, "What's New in Econometrics? Difference-in-Differences Estimation", Lecture Notes 10, Summer '07, Retrieved from the internet: URL:http://www.nber.org/WNE/lect_10_diffindiffs.pdf [retrieved on Jan. 11, 2018] 19 pages.
"The cost of ad blocking", PageFair and Adobe 2015 Ad Blocking Report, Retrieved for the internet: URL:https://downloads.pagefair.com/wp-content/uploads/2016/05/2015_report-the_cost_of_ad_blocking.pdf [retrieved on Jan. 11, 2018] 17 pages.
BlockAdBlock | Stop Losing Ad Revenue, "Ad-blocking has gone exponential", Retrieved for the internet:URL:https://blockadblock.com/ [retrieved on Jan. 16, 2018] 5 pages.
SourcePoint, "Creating compensation choice for publishers & consumers", Retrieved for the internet: URL:http://sourcepoint.com/ [retrieved on Jan. 11, 2018] 10 pages.
"Axel Springer says it is winning tight against adblockers", Retrieved for the internet: URL:http://www.ft.com/cms/s/0/0e58d68a-8305-11e5-9dc0-186bb1146746.html [retrieved on Jan. 11, 2018] 3 pages.
MacQueen, James, "Some methods for classification and analysis of multivariate observations", Proceedings of the Fifth Berkeley symposium on mathematical statistics and probability, 1967, 17 pages.
Rousseeuw, Peter J., "Silhouettes: a graphical aid to the interpretation and validation of cluster analysis", Journal of computational and applied mathematics 20, 1987, pp. 53-65.
Punit, Itika Sharma, "Indian news publishers are cracking down on ad blockers", Retrieved for the internet: URL: http://qz.com/721094/indian-news-publishers-are-cracking-down-on-ad-blockers/ [retrieved on Jan. 11, 2018] 4 pages.
Nithyanand, Rishab, et al., "Ad-Blocking and Counter Blocking: A Slice of the Arms Race", arXiv preprint arXiv:1605.05077, Jul. 20, 2016, 8 pages.
Mughees, Muhammad Haris, et al., "A First Look at Ad-block Detection: A New Arms Race on the Web" arXiv preprint arXiv:1605.05841, May 19, 2016, 12 pages.
Wilcoxon, Frank, "Individual comparisons by ranking methods", Biometrics bulletin 1.6, 1945, 4 pages.
Cookson, Robert, "News Media move to ban ad blockers from websites", Jul. 6, 2016, Retrieved for the internet: URL:https://next.ft.com/content/abf110aa-00b0-11e6-99cb-83242733f755 [retrieved on Jan. 11, 2018] 8 pages.
Greene, William H., "Accountting for Excess Zeroes and Sample Selection in Poisson and Negative Binomial Regressions Models", working paper, NYU Stern School of Business (1994), 37 pages.
Hausman, J., et al., "Economic Models for Count Data with an Application to the Patents-R&D Relationship", NBER Technical Paper Series, Retrieved for the internet: URL:http://www.nber.org/papers/t0017.pdf [retrieved on Jan. 12, 2018] 59 pages.
Pujol, Enric, et al., "Annoyed Users: Ads and Ad-Block Usage in the Wild", In Proceedings of the 2015 ACM Conference on Internet Measurement Conference(IMC '15), 14 pages.
AdBlock Analytics, "Gain insights into visitor ad blocking", Retrieved for the internet: URL:https://www.adblockanalytics.com/ [retrieved on Jan. 12, 2018] 6 pages.
Donald, Stephen G. and Kevin Lang, "Inference with Difference-in-Differences and Other Panel Data", Review of Economics and Statistics, May 2007, 33 pages.

\* cited by examiner

TECHNIQUES TO QUANTIFY EFFECTIVENESS OF SITE-WIDE ACTIONS

FIELD OF THE DISCLOSURE

This disclosure relates generally to measuring effectiveness of site-wide actions, and more particularly, to controlling sampling bias in quantifying the effectiveness of site-wide actions.

BACKGROUND

Organizations implement many actions across all traffic arriving on their websites, in an attempt to enhance visitor experiences. Actions that are implemented across the website are typically referred to as site-wide actions. Examples of site-wide actions include a launch of a new, redesigned, or rebranded website, webpage, landing page, etc., and a launch of a service, a feature, or a product across the website, to name a few examples. Before implementing a site-wide change to a website, webpage, or other online content, organizations sometimes engage in the practice of A/B testing (otherwise known as "bucket tests" or "split-run testing"). A/B testing is a technique that is used to evaluate user engagement or satisfaction with a new service, feature, or product. A/B testing generally involves preparing two versions (also known as variants, or treatments) of an item of online content, such as a webpage, a landing page, or an online advertisement, to name a few examples, and presenting the two versions to randomly selected groups of site visitors. One of the versions is commonly the current version of the item of online content and serves as an experimental control, and the randomly selected group of site visitors who are served this version is referred to as a "control group." The other version of the item of online content serves as a treatment or an experimental manipulation, and the randomly selected group of site visitors who are served this version is referred to as a "treatment group." Note that there can be more than two versions.

In any case, the manner in which the visitors in the control group and the treatment group respond to the respective versions of the item of online content is monitored. If the new treatment version is determined to bring about a statistically significant improvement in the rate with which a specific behavior occurs (e.g., a click-through or other desired behavior), then the treatment version may be adopted site-wide as the new version of the item of online content. Once the new version of the item of online content is implemented site-wide, an organization may still be interested in evaluating the performance of the new version of the item of online content implemented site-wide. Unfortunately, as the new version of online content is implemented site-wide, A/B testing is no longer suitable to evaluate the performance as there is no longer a benchmark or control against which to measure the performance (e.g., improvement resulting from the new version of online content).

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

Figure 1:
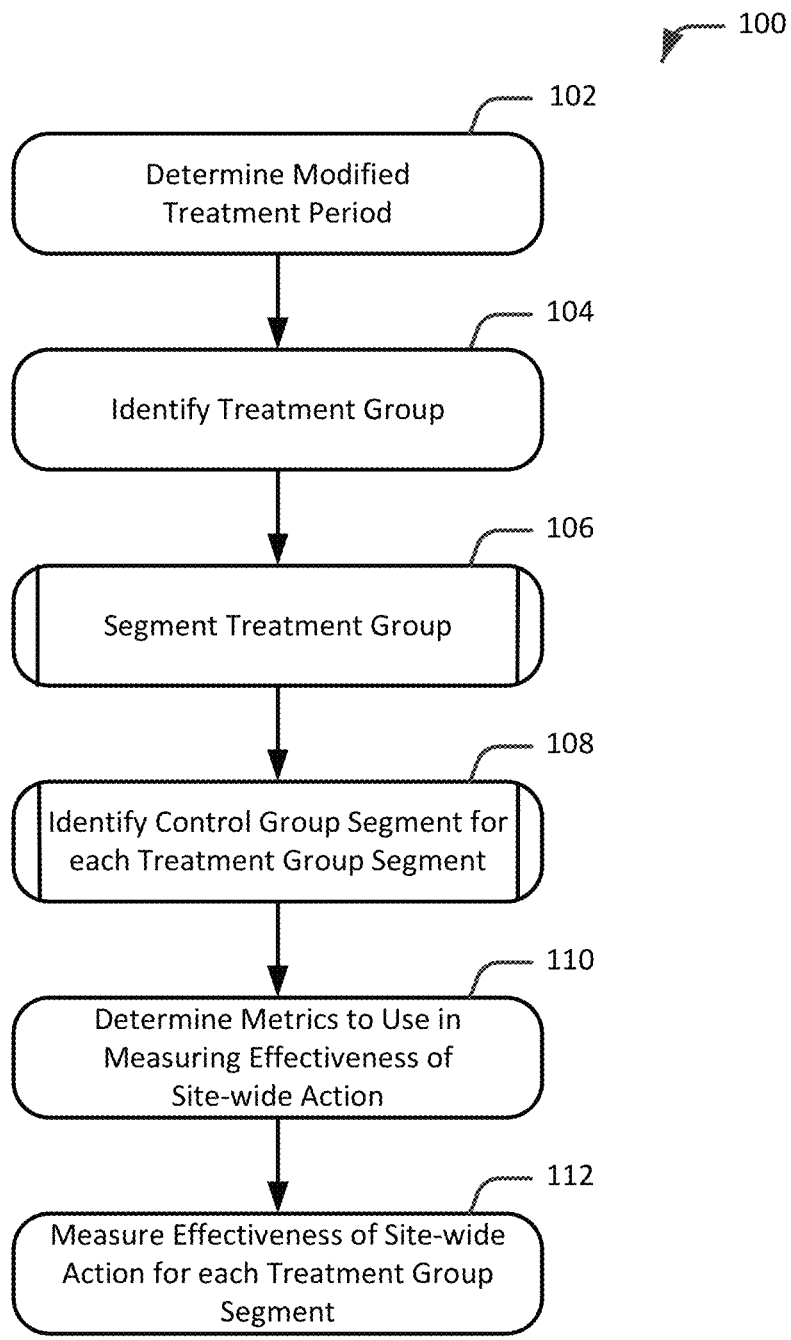
FIG. 1 is a flow diagram illustrating an example process to quantify effectiveness of a site-wide action, in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

As previously noted, AB testing is not suitable to measure effectiveness of an action upon actual site-wide implementation of the action. One technique to measure effectiveness of a site-wide action is to compare effectiveness metrics taken after implementation of the site-wide action with effectiveness metrics taken before implementation of the site-wide action. Consider, for example a redesigned landing page for a website as an example site-wide action. In such a case, metrics such as the number of visitors converting or clicking through can be collected for a specified time period prior to implementing the redesigned landing page site-wide and for the visitors who are landing on the current (pre-redesign) landing page. Then, for a specified time period after launching the redesigned landing page site-wide and for the visitors who are landing on the redesigned landing page, the same metrics can be collected. The pre-launch metrics can then be compared to the post-launch metrics to determine the effectiveness of the redesigned landing page (the site-wide action). However, an assumption made by the before-after comparison is that, other than the site-wide action, all other variables remain constant, which, unfortunately, is not valid in many instances. Moreover, the results of the before-after comparison may be erroneous due to sampling bias caused by, for example, difference in compositions of the control group and the treatment group, difference in time periods selected for the before and after measurements, and other differences. One possible solution to account for the sampling bias arising from differences between the control and treatment groups may be to use an approach such as difference-in-differences (DiD) to measure effectiveness of a site-wide action. DiD calculates the effect of a treatment (e.g., an explanatory variable or an independent variable) on an outcome (e.g., a response variable or a dependent variable) by comparing the average change over time in the outcome variable for the treatment group, compared to the average change over time for the control group. However, DiD assumes an exogenously determined control period (e.g., control time period). Moreover, DiD assumes that a control group is available for comparison, and that the control group can be observed over the same time periods as that of the treatment group, both before and after implementation of the action. Unfortunately, in a site-wide action, no natural control group exists within the data for the time period after the implementation of the site-wide action since every group (e.g., visitor to the site) is subjected to the action.

To this end, disclosed herein is a site-wide action effectiveness measurement framework ("framework") for quantifying true effectiveness of site-wide actions. Various embodiments of the framework provide modifications to the difference-in-differences (DiD) technique to allow for measuring effectiveness of site-wide actions where no control group exists within the data subsequent to implementation of the site-wide actions. In some embodiments, the framework provides a site-wide action measurement module (interchangeably referred to herein as a "measurement module") configured to measure (e.g., estimate) the effectiveness of a site-wide action based on a control group statistically selected from a time period prior to implementation of the site-wide action. That is, the measurement module provides a measurement of the effectiveness of a site-wide action based on a control group statistically selected from a time period (duration of time) prior to intervention of the site-wide action. As a consequence of having to select a control group from a retrospective time period, and not from a time period concurrent with a treatment group, the measurement module utilizes a modified treatment period that encompasses the intervention of the site-wide action. That is, the modified treatment period includes a pre-intervention time period, which is a duration of time from the start of the modified treatment period to immediately preceding (before) implementation of the site-wide action, and a post-intervention time period, which is a duration of time from immediately following (after) implementation of the site-wide action to the end of the modified treatment period. Based on a modified treatment period, the measurement module can identify a treatment group that includes all users who are exposed to the site-wide action during the modified treatment period (i.e., during both the pre-intervention time period and the post-intervention time period).

In some embodiments, the measurement module selects a control group that exhibits characteristics that match the characteristics of the treatment group to which the site-wide action is applied. That is, the members of the selected control group exhibit characteristics that match the characteristics of the treatment group. The members of the selected control group are naturally unexposed to the site-wide action. The members of the control group are those who would have been exposed to the site-wide action had the site-wide action been implemented, for example, during the control period. In some embodiments, the measurement module selects a control group from among multiple candidate control groups. For example, multiple control periods may be identified, and a candidate control group identified from each of the multiple control periods. In this instance, each candidate control group is associated with a respective control period, which may be of a time duration that is the same as the time duration of the modified treatment period. The control period is a duration of time over which the respective candidate control group is observed. Additionally or alternatively, the control periods for the multiple candidate control groups may vary. That is, the candidate control groups may be associated with differing time periods prior to the modified treatment period (e.g., implementation of the site-wide action). Accordingly, the framework provides for endogenous selection of the control group and the control period.

In some embodiments, the measurement module segments (clusters) the treatment group into multiple treatment group segments. For example, the treatment group may be segmented to account for the heterogeneity in the behaviors of the members of the treatment group. The treatment group may be segmented based on one or more features that describe or capture the behavioral characteristics of the members of the treatment group. A control group segment is then selected for each treatment group segment. For example, in the case of a single control period, multiple control group segments may be identified from the control period based on the features used to segment the treatment group. A control group segment that corresponds to a treatment group segment can be selected for that treatment group segment. In the case of multiple control periods, for each control period, multiple candidate control group segments may be identified based on the features used to segment the treatment group. That is, in each control period, a candidate control group segment may be identified for each treatment group segment. As there are multiple control periods, multiple candidate control group segments may be identified for each treatment group segment. Then, for each treatment group segment, a control group segment can be selected from the multiple candidate control group segments. In some embodiments, the control group segment selected for each treatment group segment is a control group segment that best matches the characteristics of the respective treatment group segment. As will be appreciated in light of this disclosure, a control group segment (or a candidate control group segment) may be an empty segment in the sense that the segment does not include any members. Accordingly, the framework recognizes heterogeneity and addresses sampling biases arising from the differences between group compositions across before and after periods (e.g., across time period prior to implementation of a site-wide action and time period after implementation of a site-wide action).

In some embodiments, the measurement module applies negative binomial regression in measuring true effectiveness of site-wide actions. The measured key performance indicators (KPIs) of interest (e.g., dependent variables) in the conventional DiD technique may be over-dispersed. That is, the measurements of the KPIs may exhibit high variability. To account for over dispersion, the measurement module applies negative binomial regression on the KPI measurements to account for over-dispersion and achieve a better statistical fit. In other embodiments, other regression methods, such as linear or Poisson regression, may be applied to account for over-dispersion. The regression model may depend upon the KPIs used, and a suitable one can be used as appropriate.

In an example use case and embodiment, a treatment (site-wide action) may be an anti-advertisement (anti-ad) blocking strategy implementation by a publisher on its website. In the case of the anti-ad blocking strategy, the ad blockers are subjected to the anti-ad blocking strategy implementation. That is, the non-ad blockers are not subjected to the anti-ad blocking strategy implementation. The publisher, or an entity performing the treatment analysis, can specify a time period over which the effectiveness of the anti-ad blocking strategy implementation is to be examined (modified treatment period). In some embodiments, a time duration that encompasses the intervention of the anti-ad blocking strategy implementation is specified as a modified treatment period. That is, the publisher may specify a modified treatment period that includes a pre-intervention duration of time immediately before the start of the anti-ad blocking strategy implementation and a post-intervention duration of time immediately after start of the anti-ad blocking strategy implementation. The ad blockers who visit the website during the modified treatment period (during the pre-intervention duration of time and the post-intervention duration of time) constitute a treatment group. In the example of the anti-ad blocking strategy implementation being the treatment, the action may be a "denial of service" or "some message asking visitors of the website to subscribe", etc. The action is only presented to the visitors of the website who have ad blocking software installed on their computing devices. For example, when a visitor launches the publisher website on a browser, the website can detect whether the visitor (or browser) has installed ad blocking software. If the visitor did not install ad blocking software, then the website is able to present (show) ads to the visitor. Alternatively, if the website detects that the visitor has installed ad blocking software, the website is not able to present ads to the visitor. In this instance, the website directs the anti-ad blocking action to the visitor. The anti-ad blocking action is a site-wide action since it applies to all ad blockers. The anti-ad blocking action does not discriminate among the ad blockers. Conversely, the website does not need to direct the anti-ad blocking action to the visitors who are not ad blockers, as the website can present ads to these visitors.

In some embodiments, the publisher may specify one or more features to use in segmenting the treatment group. Examples of features include tags associated with content (e.g., webpages) provided on the website, average time spent on a specific tag, bi-grams and/or tri-grams associated with a visit to the website, number of hits per visit to the website, browser family, browser version, operating system family, and operating system version, to name a few examples. For example, the publisher may desire to segment the treatment group in order to account for the heterogeneity in the behaviors of the ad blockers. Segmenting the treatment group may allow for determining the true effectiveness of the anti-ad blocking strategy by segments or clusters of the ad blockers (the treatment group) who vary in behavior. In some embodiments, the measurement module categorizes the specified features into one or more feature groups such as loyalty, visit interest, technology, and geo-segmentation, to name a few examples, and segments the treatment group into one or more treatment group segments based on the feature groups. In some embodiments, the measurement module can segment the treatment group based on the feature groups using an unsupervised clustering technique, such as a K-means clustering algorithm with Euclidean distance. The measurement module may further assess the quality (e.g., stability) of the treatment group segments using silhouette scores. In other embodiments, other suitable segmentation methods may be used to segment the treatment group. Additionally or alternatively, different benchmark metrics may be available to select the optimal number of segments. Once segmented, each treatment group segment can be defined in terms of the features that are used to segment the treatment group. Accordingly, each treatment group segment is associated with and can be defined by a treatment group segment definition.

Continuing the publisher example, the measurement module can identify one or more control periods prior to the modified treatment period (e.g., prior to the start of the anti-ad blocking strategy implementation) from which to identify candidate control group segments for each treatment group segment. In some embodiments, the duration of each identified control period is the same as the duration of the modified treatment period. That is, each identified control period from which to identify candidate control group segments and the modified treatment period are of the same time duration. The measurement module can identify, from each control period, a candidate control group segment for each treatment group segment. In the case of one control period, the measurement module can identify from the control period a candidate control group segment for each treatment group segment. In this case, the identified candidate control group segment for a respective treatment group segment is the control group segment selected for that respective treatment group segment. In the case of multiple control periods, the measurement module can identify a candidate control group segment in each control period for each treatment group segment. Accordingly, the measurement module can identify multiple candidate control group segments, one candidate control group segment in each control period, for each treatment group segment. One candidate control group segment of the multiple candidate control group segments is selected for each treatment group segment, and the selected candidate control group segment can belong to any one of the several control periods. In some example cases, the measurement module can identify candidate control group segments by classifying (e.g., fitting) each ad blocker that visited the website (e.g., each visitor who would have been subjected to the treatment) during each control period into one of the treatment group segment definitions associated with the treatment group segments. The measurement module can then select for each treatment group segment, a candidate control group segment from among the candidate control group segments that closest match the respective treatment group segment. That is, from the multiple candidate control group segments (e.g., one candidate control group segment from each of the identified control periods) for a specific treatment group segment, a candidate control group segment whose members closest match in characteristics the members of the specific treatment group segment is selected as a control group segment for that specific treatment group segment. In some embodiments, the measurement module determines the closest match based on the Wilcoxon Test. For example, in the publisher example, the measurement module can select the closest matching candidate control group segment by measuring behavioral similarities, such as web behavioral similarities, browsing behavioral similarities, and the like, between members of each candidate control group segment and members of each treatment group segment. In other embodiments, the measurement module may use any suitable statistical test for matching two samples to determine the closest match. The measurement module is then able to determine a control period for each control group segment (each selected candidate control group segment) to be the time period from which the control group segment is selected.

The selected control group (the selected control group segment) provides an appropriate baseline for examining the effectiveness of the treatment (anti-ad blocking strategy implementation) for an outcome metric of interest to the publisher. One objective for selecting a control group (or a control group segment) is to observe the behavior of the ad blockers in a counter factual setting. That is, to observe the behavior of the ad blockers as if the anti-ad blocking strategy was not implemented, during the same time period as that of the anti-ad blocking strategy implementation. Since all ad blockers are exposed to the treatment, one or more candidate control groups (or candidate control group segments) may be selected based on similarity of behavior to ad blockers in control periods prior to the modified treatment period. Non-ad blockers cannot be used as a control population as the non-ad blockers fundamentally differ with respect to their behaviors toward the website.

Continuing the publisher example, the publisher can specify the metrics of interest in analyzing the effectiveness of the treatment. For example, the metrics of interest to the publisher may be count metrics, such as page views and time spent on the website, to name a few examples. The measurement module then provides a modified DiD estimate of the effects of the treatment on each treatment group segment based on the metrics of interest. For example, provided the metrics of interest, a treatment group segment, and a control group segment corresponding to the treatment group segment as inputs, the measurement module can generate a modified DiD estimate of the effect of the treatment on the treatment group segment. Based on the measures of the effects of the treatment on a treatment group segment, the publisher can decide to continue, change, intensify, or discontinue the treatment, and/or apply other types of targeting methods for the treatment group segment.

Although certain embodiments and/or examples are described herein in the context of a publisher and an anti-ad blocking strategy implementation, it will be appreciated in light of this disclosure that such embodiments and/or examples are not restricted to publishers and anti-ad blocking strategy implementations but are applicable to organizations that provide content though an accessible site, such as a website, and any site-wide action, in the general sense. By way of only one example, the organization may be a retailer, and the site-wide action may be a discount or sale offered through the retailer website. In this example case, different from the anti-ad blocking strategy implementation example, all visitors to the retailer website are subjected to the treatment (the offered discount or sale). As such, the treatment group is comprised of all visitors to the website during the modified treatment period, and the control group is similarly comprised of all visitors to the website during the control period.

As used herein, the term "site-wide action" refers to an action that is implemented across all traffic arriving on a website. Some examples of a site-wide action include a launch of a new, redesigned, or rebranded web site, webpage, landing page, etc., and a launch of a service, a feature, or a product across a website. Other examples of a site-wide action include an anti-ad blocking implementation and a discount or sale offered through a website.

As used herein, the term "modified treatment period" refers to a time period from which to select a treatment group. In the context of a site-wide action, a modified treatment period refers to a time period over which an effectiveness of a site-wide action implementation is to be examined. A modified treatment period can be a time duration that encompasses an intervention of the site-wide action implementation, and includes a pre-intervention time period and a post-intervention time period.

As used herein, the term "pre-intervention time period" refers to a duration of time from the start of the modified treatment period to immediately preceding (before) implementation of the site-wide action.

As used herein, the term "post-intervention time period" refers to a duration of time from immediately following (after) implementation of the site-wide action to the end of the modified treatment period.

As used herein, the term "treatment group" refers to a group that receives a treatment. In the context of a site-wide action, a treatment group refers to all users who are exposed to the site-wide action during a modified treatment period (i.e., during both the pre-intervention time period and the post-intervention time period).

As used herein, the term "control period" refers to a time period from which to select a control group. In the context of a site-wide action, a control period refers to a time period prior to a modified treatment period (e.g., prior to the start of a site-wide action implementation) from which to select a control group. A control period can, in some cases, be a time duration that is the same as the time duration of the modified treatment period.

As used herein, the term "control group" refers to a group that does not receive the treatment. In the context of a site-wide action, a control group refers to a group that is naturally unexposed to the site-wide action. That is, the members of the control group are naturally unexposed to the site-wide action. The members of the control group are those who would have been exposed to the site-wide action had the site-wide action been implemented, for example, during a control period. A control group can, in some cases, include members that exhibit characteristics that match the characteristics of a treatment group.

As used herein, the term "effectiveness of a site-wide action" refers to an effect of a site-wide action on a treatment group based on a metric of interest. The effectiveness of a site-wide action can be the difference between the difference within a treatment group between post-intervention and pre-intervention time periods and the difference within a control group between post-intervention and pre-intervention time periods.

Methodology

Figure 3:
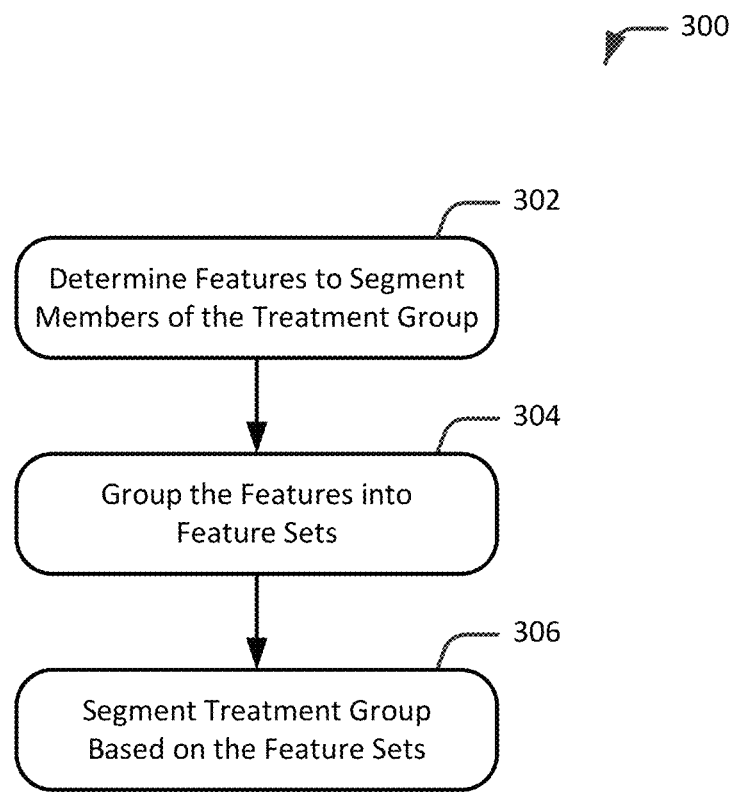
FIG. 3 is a flow diagram illustrating an example process to segment a treatment group, in accordance with at least some embodiments described herein.
Figure 5:
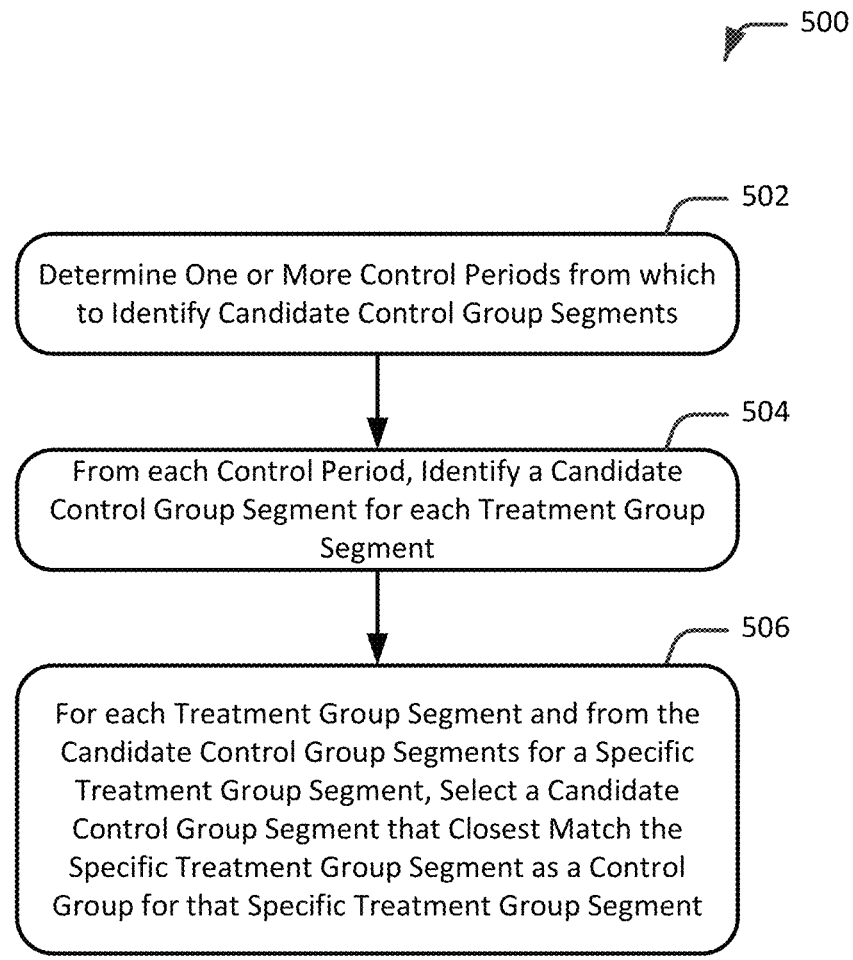
FIG. 5 is a flow diagram illustrating an example process to identify a respective control group segment for each treatment group segment, in accordance with at least some embodiments described herein.

Turning now to the figures, FIG. 1 is a flow diagram 100 illustrating an example process to quantify effectiveness of a site-wide action, in accordance with at least some embodiments described herein. FIG. 3 is a flow diagram 300 illustrating an example process to segment a treatment group, in accordance with at least some embodiments described herein. FIG. 5 is a flow diagram 500 illustrating an example process to identify a respective control group segment for each treatment group segment, in accordance with at least some embodiments described herein. The operations, functions, or actions illustrated in the example processes of flow diagrams 100, 300, and 500 may in some embodiments be performed by a computing system such as a computing system 900 of FIG. 9. The operations, functions, or actions described in the respective blocks of the example processes of flow diagrams 100, 300, and 500 may also be stored as computer-executable instructions in a computer-readable medium, such as a memory 904 and/or a data storage 906 of computing system 900. The processes may be performed by components of the site-wide action effectiveness measurement framework and, in particular, the measurement module as variously described herein.

As can be seen, the example process to quantify effectiveness of a site-wide action includes a number of phases and sub-processes, the sequence of which may vary from one embodiment to another. However, when considered in the aggregate, these phases and sub-processes form part of a site-wide action effectiveness measurement framework that leverages a control group statistically selected from a time period prior to implementation of the site-wide action. However, other system architectures can be used in other embodiments, as will be apparent in light of this disclosure.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to FIG. 1, the site-wide action effectiveness measurement framework may be utilized to ascertain the effectiveness of a site-wide action. For example, as variously described as one example throughout the disclosure, a publisher may use the framework to ascertain the effectiveness of an anti-advertisement (anti-ad) blocking strategy implementation on its website. As depicted by flow diagram 100, the process may begin with block 102, where a modified treatment period is determined. The modified treatment period indicates a time period over which the members of the modified treatment group are to be examined to evaluate or determine the effectiveness of the site-wide action. The modified treatment period includes a pre-intervention time period and a post-intervention time period. The pre-intervention time period is a duration of time that immediately precedes the intervention of the site-wide action, and during which the treatment group is not exposed to the site-wide action. The post-intervention time period is a duration of time that immediately follows the intervention of the site-wide action, and during which the treatment group is exposed the site-wide action. The pre-intervention time period and the post-intervention time period do not include the time of intervention. That is, the pre-intervention time period and the post-intervention time period do not include the duration of time taken to implement the site-wide action.

Figure 2:
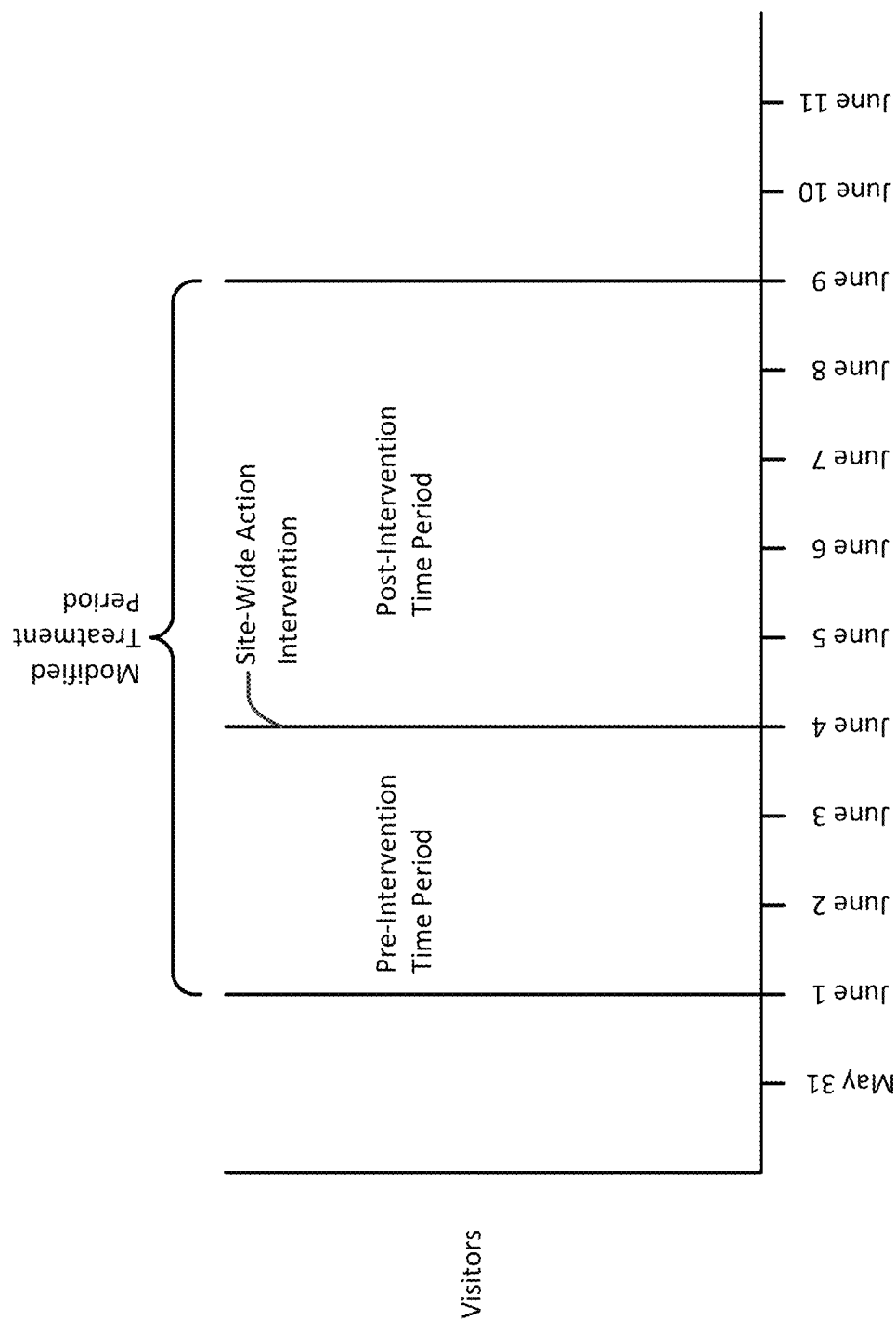
FIG. 2 is a diagram depicting an example modified treatment period, arranged in accordance with at least some embodiments described herein.

FIG. 2 is a diagram depicting an example modified treatment period, arranged in accordance with at least some embodiments described herein. Continuing the publisher example and as depicted in FIG. 2, the publisher may have implemented the anti-ad blocking strategy on its website at 12 midnight on June 3. Knowing the time of implementation of the anti-ad blocking strategy, the publisher may specify a modified treatment period from June 1 to June 9, a duration of eight (8) days. The period from June 1 to June 4, a duration of three (3) days is the pre-intervention time period. The period from June 4 to June 9, a duration of five (5) days, is the post-intervention time period. For example, the publisher may have chosen the duration of eight (8) days to reflect the variation in the visitors' arrival to the website across weekdays and weekends. The example modified treatment period depicted in FIG. 2 assumes that the anti-ad blocking strategy was implemented "instantaneously" or "near instantaneously" at 12 midnight on June 3, and the publisher had knowledge of the exact time of intervention. In instances where the implementation of the treatment is not instantaneous, the period of time taken to implement the treatment is not included in the pre-intervention and post-intervention time periods. For example, if the anti-ad blocking strategy implementation occurred over a six (6) hour time period from 1800 hours on June 3 to 12 midnight on June 3, the pre-intervention time period is the period from June 1 to 1800 hours on June 3, a duration of two and three-quarter (2.75) days. Additionally or alternatively, in instances where the exact time or time period of implementation of the treatment is not known, a modified treatment period can accordingly be specified that includes a pre-intervention time period and a post-intervention time period that does not include a time duration that accounts for the implementation of the treatment.

Referring again to FIG. 1, block 102 may be followed by block 104, where the measurement module identifies a treatment group based on the modified treatment period. The treatment group includes all users who are exposed to the treatment during the pre-intervention time period and the post-intervention time period of the modified treatment period. Continuing the publisher example, the measurement module can identify the treatment group to include the visitors to the website who are ad-blockers and who visited the website during the pre-intervention time period (from June 1 to June 4) and the post-intervention time period (from June 4 to June 9). The measurement module can identify the members of the treatment group using website log files or other suitable log data.

Block 104 may be followed by block 106, where the measurement module segments the treatment group. For example, members of the treatment group are typically not homogeneous but, rather, heterogeneous with regards to behavior. The measurement module can determine one or more features, for example, behavioral characteristics and/or non-behavioral characteristics, that may be useful in describing the heterogeneity of the behaviors of the members of the treatment group, and segment the treatment group based on the determined features.

FIG. 3 is a flow diagram 300 illustrating an example process to segment a treatment group, in accordance with at least some embodiments described herein. As depicted by flow diagram 300, the process may begin with block 302, where the measurement module determines one or more features to use in segmenting the treatment group. Continuing the publisher example, the measurement module may have access to hit level data collected through the publisher website. The measurement module can determine one or more features that capture behavioral and/or static characteristics of web profiles associated with members of the treatment group. For example, the publisher may have defined a number of tags, such as "Culture", "Technology", "Sports", "Leisure", "Living", "Entertainment", "Food", "Travel", and the like, to categorize the content (e.g., articles), and associated a tag or tags to each webpage provided on the website. The tag based (tag level) information may then be obtained by analyzing metadata such as Uniform Resource Locators (URLs), content titles, page titles, etc., included in the browsing session data collected through the website. The measurement module can determine features, such as average time spent on a tag, bi-grams, and tri-grams, to name a few examples, which capture the reading interests of each visitor (e.g., member of the treatment group). Average time spent on a tag may indicate of an amount of time (e.g., measured in seconds) spent by a visitor on a particular tag in a browsing session. The amount of time spent by the visitor on a tag may be normalized by the number of times the visitor visited a webpage having that specific tag. The bi-grams and tri-grams may indicate a visitor's interest in reading the articles (e.g., tags, webpages, etc.) in sequence. A bi-gram may indicate a sequence of two articles, and a tri-gram may indicate a sequence of three articles. In some embodiments, the measurement module may preprocess the hit level data to filter the crawlers, such as indexing services and other automated website content traversing scripts, from the data. For example, the measurement module may filter crawlers by removing visitors from the hit level data with a very high number of hits in the same session as being a non-human visitor (e.g., a very high number of hits is not likely to have been generated by a human browsing the website).

Additionally or alternatively, the measurement module can identify one or more additional features, such as number of hits per visit, browser family, operating system (OS) family, browser version, and OS version, to name a few examples, to use in segmenting the treatment group. Number of hits per visit may be recorded for each visitor to capture a visitor's interaction with a webpage or webpages. The types of browsers, such as Explorer®, Chrome™ Firefox®, Safari™, Opera®, Edge®, and the like, used by the visitors may be heuristically grouped according to browser families to capture the variations of the visitors due to browser preference. Similarly, the types of OS, such as Linux®, Windows®, Mac OS®, and the like, used by the visitors may be heuristically grouped according to OS families to capture the variations of the visitors due to OS preference. The different browsers and OSs may be respectively grouped according to browser version and OS version. In such cases, the browser version and/or OS version may provide an indication of the technological savviness of the visitor under the premise that more savvy users typically update to the latest versions.

Block 302 may be followed by block 304, where the measurement module groups the features into one or more feature sets. For example, the features may be grouped into feature sets to capture different aspects of the characteristics of the members of the treatment group. In some embodiments, the measurement module can determine the feature sets based on the determined features. Additionally or alternatively, the feature sets to use in grouping the features may be provided to the measurement module. For example, an organization implementing the treatment or an entity measuring the effectiveness of the treatment may specify the feature sets.

Continuing the publisher example, the measurement module may group the features into feature sets, such as, Loyalty, Reading Interest, Technology, and Geo-Segmentation, to name a few examples, to capture the different aspects of a treatment group member's web profile. Loyalty feature set may provide an indication of a visitor's loyalty to the publisher website, and may include features such as number of visits to the website, total time spent on the website, an indication of whether the visitor read at least five webpages, and the like. Reading Interest feature set may provide an indication of a visitor's reading behavior while visiting the publisher website, and may include features such as frequency of visits to culture related webpages, sports related webpages, technology related webpages, food related webpages, etc., average time spent on culture related webpages, sports related webpages, technology related webpages, food related webpages, etc., and the like. Technology feature set may provide an indication of the technological aspect of a visitor's user profile, and may include features such as browser family, browser version, OS family, OS version, cookie data, JavaScript version, and the like. Geo-Segmentation feature set may provide an indication of a visitor's geographic location or characteristics of the geographic location, and may include features such as country, region of the country (e.g., state, county, etc.), city, category of city (e.g., size of city, etc.), language, and the like.

Block 304 may be followed by block 306, where the measurement module segments the treatment group based on the feature sets. In some embodiments, the measurement module segments the treatment group into one or more treatment group segments using an unsupervised clustering technique, such as a K-means clustering algorithm with Euclidean distance or other suitable distance measures. For example, the feature sets may be provided as inputs to the unsupervised clustering to generate the treatment group segments based on the feature sets. In some embodiments, the measurement module can assess the stability of the treatment group segments based on silhouette scores. In cases where the treatment group is a very large data set, the measurement module may segment the treatment group using other suitable techniques, such as Mini-batch clustering with Calinski-Harabasz criterion.

Figure 4:
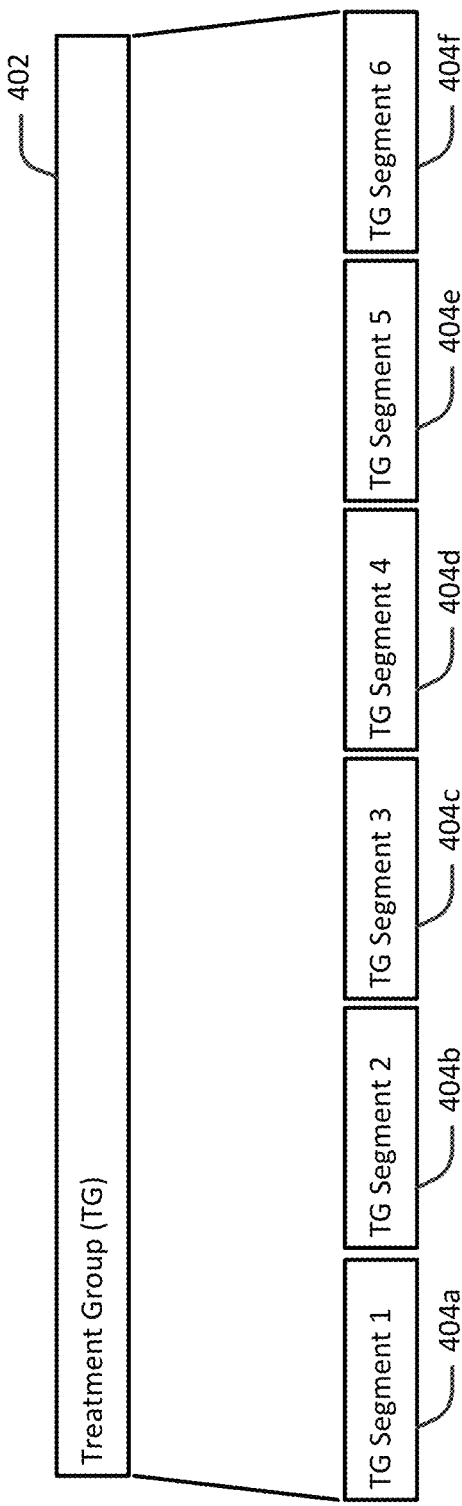
FIG. 4 is a diagram depicting an example treatment group and corresponding treatment group segments, arranged in accordance with at least some embodiments described herein.

FIG. 4 is a diagram depicting an example treatment group and corresponding treatment group segments, arranged in accordance with at least some embodiments described herein. Continuing the publisher example and as depicted in FIG. 4, the measurement module may have identified a treatment group (TG) 402 for the anti-ad blocking strategy implementation. As discussed above, TG 402 includes the visitors to the website who are ad-blockers and who visited the website during the pre-intervention time period (from June 1 to June 4) and the post-intervention time period (from June 4 to June 9). Based on the feature sets, the measurement module may have segmented TG 402 into six (6) treatment group segments, a TG Segment 1 404a, a TG Segment 2 404b, a TG Segment 3 404c, a TG Segment 4 404d, a TG Segment 5 404e, and a TG Segment 6 404f. Each treatment group segment can be defined by the features associated with the particular treatment group segment. For example, TG Segment 1 404a can be defined by the features of the members (e.g., the ad blockers) of TG Segment 1 404a, TG Segment 2 404b can be defined by the features of the members (e.g., the ad blockers) of TG Segment 2 404b, and so on. The number of treatment group segments depicted in FIG. 4 is for illustration, and it will be appreciated in light of this disclosure that a treatment group may be segmented into a different number of treatment group segments based on the characteristics of the members of the treatment group and the feature groups used to segment the treatment group.

Referring again to FIG. 1, block 106 may be followed by block 108, where the measurement module identifies a control group segment for each treatment group segment. A specific control group segment identified for a particular treatment group segment serves as a control group, which is a baseline used by the measurement module to measure the effectiveness of the site-wide action on the particular treatment group segment. In some embodiments, the measurement module identifies multiple candidate control group segments for each treatment group segment, and selects a candidate control group segment from the multiple candidate control group segments as a control group for each treatment group segment.

FIG. 5 is a flow diagram 500 illustrating an example process to identify a respective control group segment for each treatment group segment, in accordance with at least some embodiments described herein. As depicted by flow diagram 500, the process may begin with block 502, where the measurement module determines one or more control periods prior to the modified treatment period (e.g., prior to the intervention of the treatment) from which to identify candidate control group segments for each treatment group segment. Each control period may be of a time duration equal to the modified treatment period. In some embodiments, each control period may include the same series of days that are included in the modified treatment period. For example, if the modified treatment period includes a series of days from a Monday to a Sunday, each control period may be of the same series of days from a Monday to a Sunday. In some embodiments, the one or more control periods from which to identify candidate control group segments may be provided to the measurement module. For example, an organization implementing the treatment or an entity measuring the effectiveness of the treatment may specify the one or more control periods.

Block 502 may be followed by block 504, where the measurement module identifies, from each control period, a candidate control group segment for each treatment group segment. In some embodiments, the measurement module can first identify a candidate control group from each control period. The candidate control group from a specific control period includes all users who would have been exposed to the treatment had the treatment been implemented during the specific control period. The measurement module can then classify each member of each candidate control group into one of the treatment group segment definitions (e.g., the features that define each of the treatment group segments) to identify the candidate control group segments for each treatment group segment.

Figure 6:
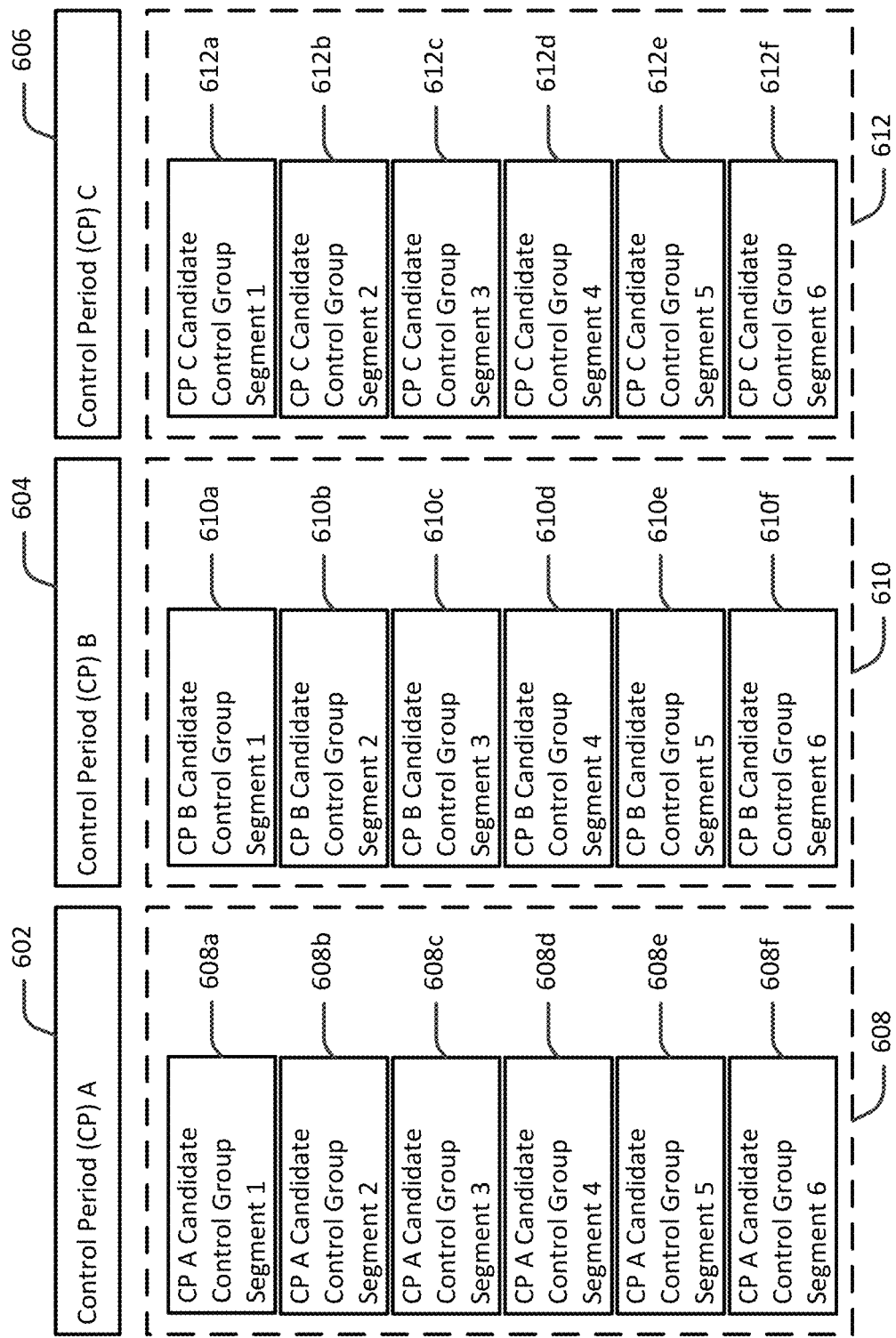
FIG. 6 is a diagram depicting example control periods and corresponding candidate control group segments, in accordance with at least some embodiments described herein.

FIG. 6 is a diagram depicting example control periods and corresponding candidate control group segments, in accordance with at least some embodiments described herein. Continuing the publisher example and as depicted in FIG. 6, the measurement module may identify three control periods, a control period (CP) A 602, a CP B 604, and a CP C 606, from which to identify candidate control group segments for each treatment group segment, TG Segment 1 404a, a TG Segment 2 404b, a TG Segment 3 404c, a TG Segment 4 404d, a TG Segment 5 404e, and a TG Segment 6 404f. CP A 602, CP B 604, and CP C 606 may each be a duration of eight (8) days (e.g., the same duration as the modified treatment period). The measurement module identifies a candidate control group from each control period to include the ad blockers who visited the publisher website during the respective control period. As depicted in FIG. 6, the measurement module identifies a candidate control group 608 from CP A 602, a candidate control group 610 from CP B 604, and a candidate control group 612 from CP C 606. The measurement module can then classify each ad blocker included in each candidate control group into one of the treatment group segment definitions based on the characteristics of each ad blocker and each ad blocker's visit to the publisher website. The characteristics used to classify each ad blocker may be similar to the features used to segment the ad-blockers in the treatment group into the treatment group segments. In this manner, the measurement module identifies a candidate control group segment in each control period for each treatment group segment.

As depicted in FIG. 6, the measurement module identifies a CP A Candidate Control Group Segment 1 608a, a CP A Candidate Control Group Segment 2 608b, a CP A Candidate Control Group Segment 3 608c, a CP A Candidate Control Group Segment 4 608d, a CP A Candidate Control Group Segment 5 608e, and a CP A Candidate Control Group Segment 6 608f from candidate control group 608; a CP B Candidate Control Group Segment 1 610a, a CP B Candidate Control Group Segment 2 610b, a CP B Candidate Control Group Segment 3 610c, a CP B Candidate Control Group Segment 4 610d, a CP B Candidate Control Group Segment 5 610e, and a CP B Candidate Control Group Segment 6 610f from candidate control group 610; and a CP C Candidate Control Group Segment 1 612a, a CP C Candidate Control Group Segment 2 612b, a CP C Candidate Control Group Segment 3 612c, a CP C Candidate Control Group Segment 4 612d, a CP C Candidate Control Group Segment 5 612e, and a CP C Candidate Control Group Segment 6 612f from candidate control group 612. CP A Candidate Control Group Segment 1 608a, CP B Candidate Control Group Segment 1 610a, and CP C Candidate Control Group Segment 1 612a may be identified as candidate control group segments for TG Segment 1 404a; CP A Candidate Control Group Segment 2 608b, CP B Candidate Control Group Segment 2 610b, and CP C Candidate Control Group Segment 2 612b may be identified as candidate control group segments for TG Segment 2 404b; CP A Candidate Control Group Segment 3 608c, CP B Candidate Control Group Segment 3 610c, and CP C Candidate Control Group Segment 3 612c may be identified as candidate control group segments for TG Segment 3 404c; CP A Candidate Control Group Segment 4 608d, CP B Candidate Control Group Segment 4 610d, and CP C Candidate Control Group Segment 4 612d may be identified as candidate control group segments for TG Segment 4 404d; CP A Candidate Control Group Segment 5 608e, CP B Candidate Control Group Segment 5 610e, and CP C Candidate Control Group Segment 5 612e may be identified as candidate control group segments for TG Segment 5 404e; and CP A Candidate Control Group Segment 6 608f, CP B Candidate Control Group Segment 6 610f, and CP C Candidate Control Group Segment 6 612f may be identified as candidate control group segments for TG Segment 6 404f. That is, the ad blockers, if any, in CP A Candidate Control Group Segment 1 608a, CP B Candidate Control Group Segment 1 610a, and CP C Candidate Control Group Segment 1 612a have similar features to the ad blockers in TG Segment 1 404a. Similarly, the ad blockers, if any, in CP A Candidate Control Group Segment 2 608b, CP B Candidate Control Group Segment 2 610b, and CP C Candidate Control Group Segment 2 612b have similar features to the ad blockers in TG Segment 2 404b, the ad blockers, if any, in CP A Candidate Control Group Segment 3 608c, CP B Candidate Control Group Segment 3 610c, and CP C Candidate Control Group Segment 3 612c have similar features to the ad blockers in TG Segment 3 404c, and so on.

Referring again to FIG. 5, block 504 may be followed by block 506, where the measurement module selects a candidate control group segment to be a control group for each treatment group segment. The measurement module can select the candidate control group segment from among the candidate control group segments identified for each treatment group segment. In some embodiments, the measurement module can determine one or more variables that are relevant to selecting a candidate control group segment to be a control group for a treatment group segment. For example, the variables may be relevant for matching members of each candidate control group segment to the members of the treatment group segment to select a candidate control group segment from the candidate control group segments for the treatment group segment. In some embodiments, the measurement module can compare the distribution of the members of each candidate control group segment over the variables, and use the Wilcoxon Test to select a candidate control group segment that closest match the treatment group segment as a control group for the treatment group segment.

Figure 7:
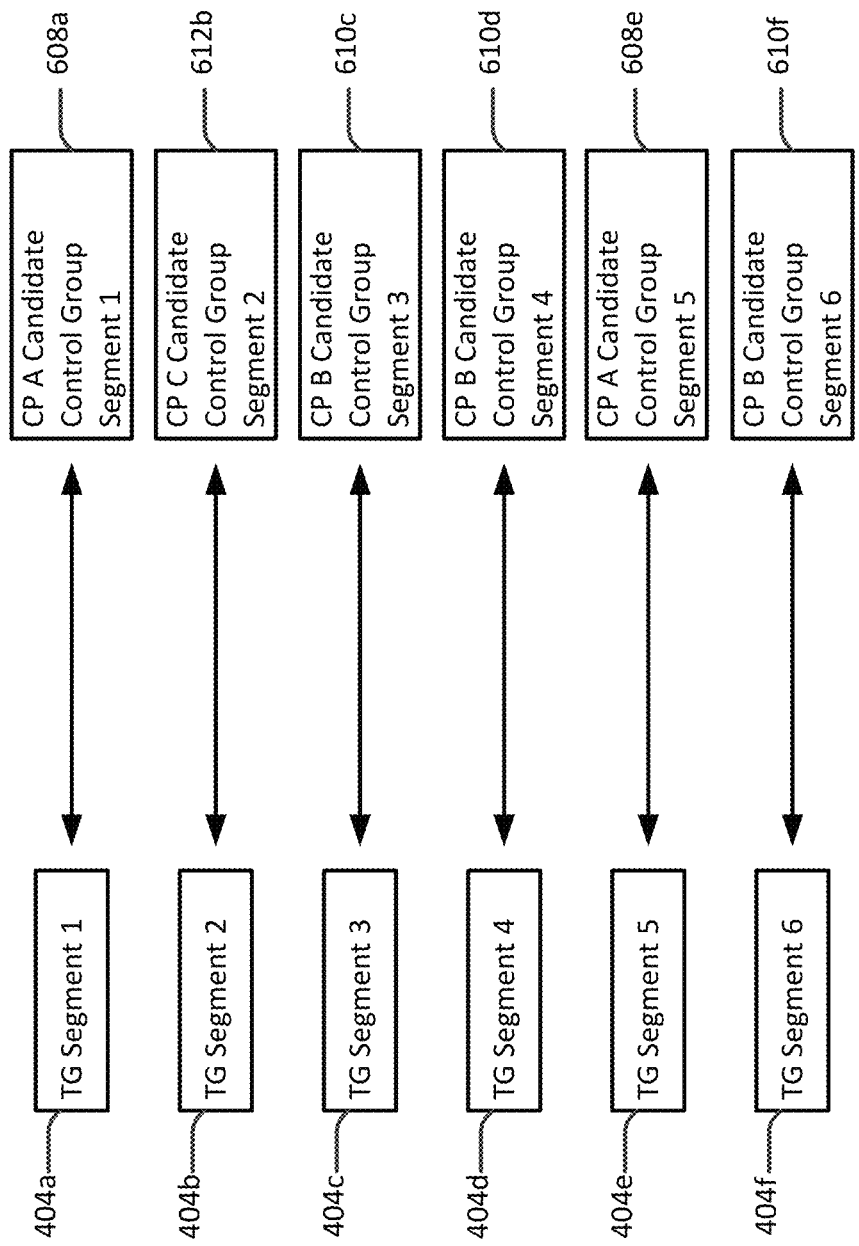
FIG. 7 is a diagram depicting example associations between treatment group segments and candidate control group segments, in accordance with at least some embodiments described herein.

FIG. 7 is a diagram depicting example associations between treatment group segments and candidate control group segments, in accordance with at least some embodiments described herein. Continuing the publisher example and as depicted in FIG. 7, the measurement module may identify CP A Candidate Control Group Segment 1 608a as a control group for TG Segment 1 404a, CP C Candidate Control Group Segment 2 612b as a control group for TG Segment 2 404b, CP B Candidate Control Group Segment 3 610c as a control group for TG Segment 3 404c, CP B Candidate Control Group Segment 4 610d as a control group for TG Segment 4 404d, CP A Candidate Control Group Segment 5 608e as a control group for TG Segment 5 404e, and CP B Candidate Control Group Segment 6 610f as a control group for TG Segment 6 404f. That is, among the candidate control group segments, CP A Candidate Control Group Segment 1 608a, CP B Candidate Control Group Segment 1 610a, and CP C Candidate Control Group Segment 1 612a, for TG Segment 1 404a, the ad blockers in CP A Candidate Control Group Segment 1 608a closest match in the distribution over the features to the ad blockers in TG Segment 1 404a. Similarly, among the candidate control group segments, CP A Candidate Control Group Segment 2 608b, CP B Candidate Control Group Segment 2 610b, and CP C Candidate Control Group Segment 2 612b, for TG Segment 2 404b, the ad blockers in CP C Candidate Control Group Segment 2 612b closest match in the distribution over the features to the ad blockers in TG Segment 2 404b, among the candidate control group segments, CP A Candidate Control Group Segment 3 608c, CP B Candidate Control Group Segment 3 610c, and CP C Candidate Control Group Segment 3 612c, for TG Segment 3 404c, the ad blockers in CP B Candidate Control Group Segment 3 610c closest match in the distribution over the features to the ad blockers in TG Segment 3 404c, and so on. The control period for each control group can be determined to be the control period associated with the respective candidate control group segment selected as the control group.

Referring again to FIG. 1, block 108 may be followed by block 110, where the measurement module determines one or more metrics to use in measuring the effectiveness of the site-wide action. The metric or metrics may be specified by an organization implementing the treatment or an entity measuring the effectiveness of the treatment. Continuing the publisher example, the publisher may be interested in analyzing the effectiveness of the anti-ad blocking implementation based on metrics such as page views and time spent on the publisher website.

Block 110 may be followed by block 112, where the measurement module measures the effectiveness of the site-wide action using the specified metrics for each treatment group segment. The measurement module measures the effectiveness of the site-wide action by performing a modified DiD estimation based on the modified treatment period, the treatment group segment, the control period, and the control group segment identified for the treatment group segment. The control period is the control period associated with the candidate control group segment that was selected to be the control group segment. As discussed above, the modified treatment period includes a first duration of time (first time period) immediately before intervention of the site-wide action and a second duration of time (second time period) immediately after intervention of the site-wide action. This is a consequence of the control period being from a retrospective time period and not being concurrent with the modified treatment period. The time duration of the control period is the same as the time duration of the modified treatment period. In some embodiments, the modified DiD estimation may be represented by regression equation [1] below:

$$y = \beta_0 + \beta_1 * \text{timeperiod} + \beta_2 * \text{grouptype} + \beta_3 * \text{hour}_{dummy1} + \beta_4 * \text{hour}_{dummy2} + \beta_5 * \text{weekend} + \beta_6 * \text{timeperiod} * \text{grouptype} + \text{error} \quad [1]$$

where timeperiod=1 for observation in post-intervention time period (e.g., the duration of time from immediately after intervention of the site-wide action to the end of the modified treatment period); timeperiod=0 for observation in pre-intervention time period (e.g., the duration of time from the start of the modified treatment period to immediately before intervention of the site-wide action); grouptype=1 for observation in treatment group; and grouptype=0 for observation in the control group. Dummy variables are used in equation [1] to control for effects of time of day and weekend. In some cases, the control group and the treatment group contain the same series of days.

Equation [1] accounts for variation in website visitations within a day and across weekdays and weekends through the inclusion of the dummy control variables. For example, the key performance indicators of a website may depend on the specific time of day (e.g., hour of day, etc.), and the specific day (e.g., weekday, weekend, etc.). From equation [1], the difference within the treatment group between post-intervention and pre-intervention time periods is represented by:

$$(y_{intervention,post}) - (y_{intervention,pre}) = (\beta_0 + \beta_1 + \beta_2 + \beta_6) - (\beta_0 + \beta_2) = (\beta_1 + \beta_6) \quad [2]$$

The difference within the control group between post-intervention and pre-intervention time periods is represented by:

$$(y_{control,post}) - (y_{control,pre}) = (\beta_0 + \beta_1) - (\beta_0) = (\beta_1) \quad [3]$$

The true effectiveness of the site-wide action is represented by [2]-[3]=$\beta_6$. The baseline is represented by $[(y_{intervention, post}) - (y_{intervention, pre})] = (\beta_1 + \beta_6)$, which is consistent with conventional DiD techniques.

Figure 8:
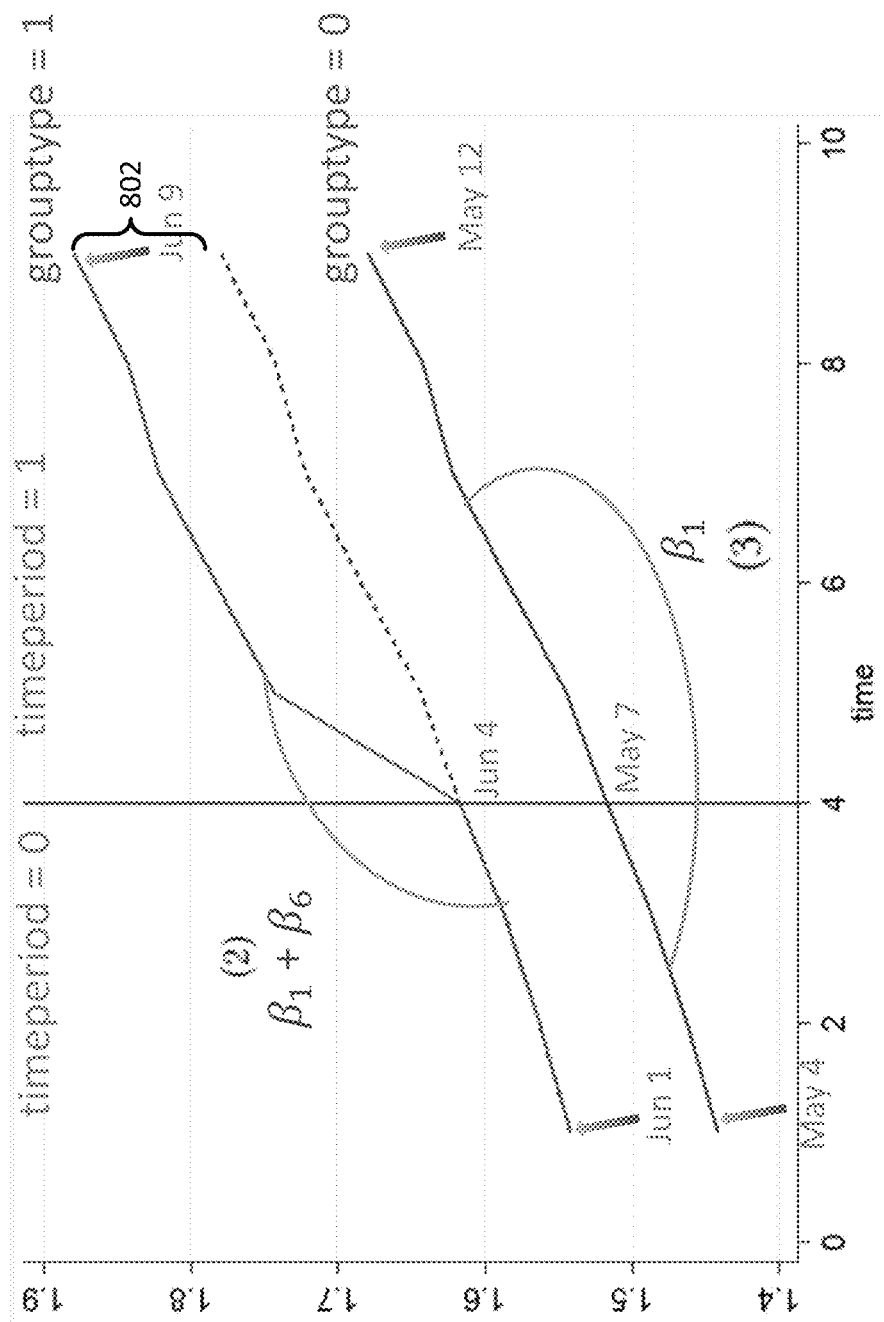
FIG. 8 is a graphical representation of an example estimation of an effectiveness of a site-wide action, in accordance with at least some embodiments described herein.

This is illustrated in FIG. 8, which is a graphical representation of an example estimation of an effectiveness of a site-wide action, in accordance with at least some embodiments described herein. As depicted, the modified treatment period associated with the treatment group segment is from June 1 to June 9, and encompasses the intervention of the site-wide action, which occurred on June 4. The control period associated with the control group (e.g., the control group segment identified for the treatment group segment) is from May 4 to May 12. The estimate of the true effectiveness of the site-wide action for the treatment group segment is the difference between the baseline and the difference within the control group between post-intervention and pre-intervention time periods, as represented by 802 in FIG. 8.

In other embodiments, the modified DiD estimation may be represented using any suitable linear model having a suitable function of y on the left side of the equation.

In some embodiments, additional operations may be performed, For example, in some embodiments, the measurement module may further apply a negative binomial regression to the modified DiD techniques described herein to measure the effectiveness of the site-wide action. The negative binomial regression may be applied to account for the over dispersion of the key performance indicators. In another embodiment, the measurement module may estimate the effectiveness of the site-wide action based on a treatment group that is not segmented (non-segmented treatment group). In such cases, the measurement module can identify a control group, without segmenting the control group, to serve as a baseline for the treatment group. In some embodiments, the measurement module can identify multiple candidate control groups, and select one candidate control group from the multiple candidate control groups as a control group for the non-segmented treatment group.

Figure 9:
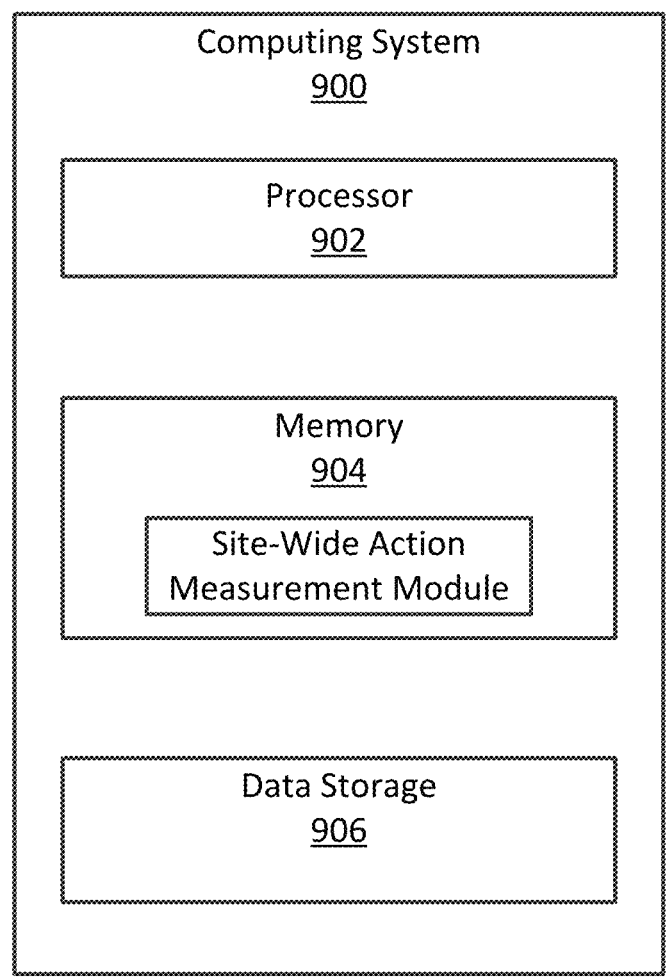
FIG. 9 illustrates selected components of an example computing system that may be used to perform any of the techniques as variously described in the present disclosure, in accordance with at least some embodiments described herein.

FIG. 9 illustrates selected components of an example computing system that may be used to perform any of the techniques as variously described in the present disclosure, in accordance with at least some embodiments described herein. In some embodiments, computing system 900 may be configured to implement or direct one or more operations associated with some or all of the engines, components and/or modules associated with the site-wide action effectiveness measurement framework. For example, the engines, components and/or modules associated with the site-wide action effectiveness measurement framework may be implemented in and/or using computing system 900. In one example case, for instance, the measurement module is loaded in memory 904 and executable by a processor 902. Computing system 900 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. A distributed computational system may be provided that includes a multiple of such computing devices. As depicted, computing system 900 may include processor 902, memory 904, and data storage 906. Processor 902, memory 904, and data storage 906 may be communicatively coupled.

In general, processor 902 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 902 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 9, processor 902 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 902 may be configured to interpret and/or execute program instructions and/or process data stored in memory 904, data storage 906, or memory 904 and data storage 906. In some embodiments, processor 902 may fetch program instructions from data storage 906 and load the program instructions in memory 904. After the program instructions are loaded into memory 904, processor 902 may execute the program instructions.

For example, in some embodiments, any one or more of the engines, components and/or modules associated with the site-wide action effectiveness measurement framework may be included in data storage 906 as program instructions. Processor 902 may fetch some or all of the program instructions from data storage 906 and may load the fetched program instructions in memory 904. Subsequent to loading the program instructions into memory 904, processor 902 may execute the program instructions such that the computing system may implement the operations as directed by the instructions.

In some embodiments, virtualization may be employed in computing device 900 so that infrastructure and resources in computing device 900 may be shared dynamically. For example, a virtual machine may be provided to handle a process running on multiple processors so that the process appears to be using only one computing resource rather than multiple computing resources. Multiple virtual machines may also be used with one processor.

Memory 904 and data storage 906 may include computer-readable storage media for carrying or having computer-executable instructions or data structures stored thereon. Such computer-readable storage media may include any available media that may be accessed by a general-purpose or special-purpose computer, such as processor 902. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 902 to perform a certain operation or group of operations.

Modifications, additions, or omissions may be made to computing system 900 without departing from the scope of the present disclosure. For example, in some embodiments, computing system 900 may include any number of other components that may not be explicitly illustrated or described herein.

As indicated above, the embodiments described in the present disclosure may include the use of a special purpose or a general purpose computer (e.g., processor 902 of FIG. 9) including various computer hardware or software modules, as discussed in greater detail herein. As will be appreciated, once a general purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 904 of FIG. 9) for carrying or having computer-executable instructions or data structures stored thereon.

Numerous example variations and configurations will be apparent in light of this disclosure. According to some examples, computer-implemented methods to quantify effectiveness of a site-wide action are described. An example computer-implemented method may include: identifying a treatment group based on a modified treatment period, the modified treatment period encompassing an intervention of a site-wide action, the modified treatment period including a pre-intervention time period and a post-intervention time period; selecting a control group from a control period prior to the modified treatment period; determining a metric for analyzing effectiveness of the site-wide action; and performing a modified difference-in-differences (DiD) estimation for the metric based on the modified treatment period, the treatment group, the control period, and the control group.

In some examples, the control group exhibits characteristics of the treatment group. In other examples, a duration of the modified treatment period is the same as a duration of the control period. In still other examples, the control group is selected from among multiple candidate control groups, the selected control group being one candidate control group of the multiple candidate control groups. In yet other examples, each candidate control group of the multiple candidate control groups is from a distinct control period. In further examples, the method may also include segmenting the treatment group into multiple treatment group segments, and selecting a control group may include selecting a control group segment for each treatment group segment of the multiple treatment group segments, the control group segment being selected from among multiple candidate control group segments. In still further examples, segmenting the treatment group is based on an unsupervised clustering technique. In yet further examples, selecting a control group segment for each treatment group segment is based on a closest match between the multiple candidate control group segments for a specific treatment group segment and the specific treatment group segment. In some examples, the closest match is determined based on a statistical test for matching two samples. In other examples, performing a modified difference-in-differences (DiD) estimation may include applying a regression model.

According to some examples, computer program products including one or more non-transitory machine readable mediums encoded with instructions that when executed by one or more processors cause a process to be carried out to quantify effectiveness of a site-wide action are described. An example process may include: identifying a treatment group based on a modified treatment period, the modified treatment period encompassing an intervention of a site-wide action, the modified treatment period including a pre-intervention time period and a post-intervention time period; selecting a control group from a control period prior to the modified treatment period; determining a metric for analyzing effectiveness of the site-wide action; and performing a modified difference-in-differences (DiD) estimation for the metric based on the modified treatment period, the treatment group, the control period, and the control group.

In some examples, the control group exhibits characteristics of the treatment group. In other examples, a duration of the modified treatment period is the same as a duration of the control period. In still other examples, the control group is selected from among multiple candidate control groups, each candidate control group of the multiple candidate control groups being from a distinct control period. In further examples, the process may also include segmenting the treatment group into multiple treatment group segments, and selecting a control group may include selecting a control group segment for each treatment group segment of the multiple treatment group segments, the control group segment being selected from among multiple candidate control group segments. In still further examples, segmenting the treatment group is based on an unsupervised clustering technique. In yet further examples, selecting a control group segment for each treatment group segment is based on a closest match between the multiple candidate control group segments for a specific treatment group segment and the specific treatment group segment.

According to some examples, systems to quantify effectiveness of a site-wide action are described. An example system may include: one or more non-transitory machine readable mediums configured to store instructions; and one or more processors configured to execute the instructions stored on the one or more non-transitory machine readable mediums. Execution of the instructions by the one or more processors may cause the one or more processors to: identify a treatment group based on a modified treatment period, the modified treatment period encompassing an intervention of a site-wide action, the modified treatment period including a pre-intervention time period and a post-intervention time period; select a control group from a control period prior to the modified treatment period; determine a metric for analyzing effectiveness of the site-wide action; and perform a modified difference-in-differences (DiD) estimation for the metric based on the modified treatment period, the treatment group, the control period, and the control group.

In some examples, the one or more non-transitory machine readable mediums may further store instructions that, in response to execution by the one or more processors, cause the one or more processors to segment the treatment group into multiple treatment group segments, and to select a control group may include to select a control group segment for each treatment group segment of the multiple treatment group segments, the control group segment being selected from among multiple candidate control group segments. In other examples, to select a control group segment for each treatment group segment is based on a closest match between the multiple candidate control group segments for a specific treatment group segment and the specific treatment group segment.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to quantify effectiveness of a site-wide action, the method comprising:
    determining a modified treatment period that surrounds an intervention of a site-wide action affecting a website, the modified treatment period including a pre-intervention time period and a post-intervention time period;
    identifying a treatment group that includes a first plurality of entities, at least some of which access the website during the pre-intervention time period and at least some of which access the website during the post-intervention time period, wherein the treatment group is identified by extracting entity identifiers from a log file associated with the website;
    segmenting the treatment group into $m_t$ treatment group segments, $m_t>1$, by
        defining a plurality of segmentation features, a particular one of which is average time spent viewing content on the website that is tagged with a particular subject matter tag,
        defining a plurality of feature sets, each of which includes one or more of the segmentation features, wherein a particular one of the feature sets defines a particular subject matter category associated with the particular subject matter tag, and
        using an unsupervised clustering technique to generate the $m_t$ treatment group segments, wherein the unsupervised clustering technique takes the plurality of feature sets as input, wherein the first plurality of entities are distributed into the $m_t$ treatment group segments, wherein a particular one of the $m_t$ treatment group segments comprises entities having expressed interest in the particular subject matter category based on their time spent viewing content on the website that is tagged with the particular subject matter tag, and wherein the particular subject matter tag is extracted from uniform resource locators that identify content viewed by the entities in the particular treatment group segment;
    determining n control periods, n>1, wherein at least a portion of each of the n control periods occurs before the modified treatment period begins, and wherein each of the n control periods ends before the intervention occurs;
    for each of the n control periods, identifying a candidate control group segment corresponding to each of the $m_t$ treatment group segments, such that each of the n control periods is associated with $m_c$ candidate control group segments, $m_c=m_t$, and such that each of the $m_t$ treatment group segments is associated with n candidate control group segments, wherein each candidate control group segment includes a second plurality of entities which access the website during the corresponding control period;
    for each of the $m_t$ treatment group segments, using a Wilcoxon Test to select one of the n associated candidate control group segments, wherein the selected control group segment has a distribution of entities that is a closest match with entities in the corresponding treatment group segment;
    determining a metric for analyzing effectiveness of the site-wide action; and
    for each of the $m_t$ treatment group segments, performing a modified difference-in-differences estimation for the metric based on the modified treatment period, the control period associated with the corresponding selected control group segment, and the corresponding selected control group segment.

2. The method of claim 1, wherein the modified treatment period excludes a duration of the intervention of the site-wide action.

3. The method of claim 1, wherein a duration of the modified treatment period is equal to a duration of each of the n control periods.

4. The method of claim 1, wherein the unsupervised clustering technique uses a K-means clustering algorithm with Euclidean distance.

5. The method of claim 1, wherein, for the particular one of the $m_t$ treatment group segments, the Wilcoxon test considers web browsing behavior similarities between entities in each of the n associated candidate control group segments and entities in the particular one of the $m_t$ treatment group segments.

6. The method of claim 1, wherein performing the modified difference-in-differences estimation comprises applying a negative binomial regression model.

7. A computer program product including one or more non-transitory machine readable mediums encoded with instructions that when executed by one or more processors cause a process to be carried out to quantify effectiveness of a site-wide action, the process comprising:
  determining a modified treatment period that surrounds an intervention of a site-wide action affecting a website, the modified treatment period including a pre-intervention time period and a post-intervention time period;
  identifying a treatment group that includes a first plurality of entities, at least some of which access the website during the pre-intervention time period and at least some of which access the website during the post-intervention time period, wherein the treatment group is identified by extracting entity identifiers from a log file associated with the website;
  segmenting the treatment group into $m_t$ treatment group segments, $m_t > 1$, by
    defining a plurality of segmentation features, a particular one of which is average time spent viewing content on the website that is tagged with a particular subject matter tag,
    defining a plurality of feature sets, each of which includes one or more of the segmentation features, wherein a particular one of the feature sets defines a particular subject matter category associated with the particular subject matter tag, and
    using an unsupervised clustering technique to generate the $m_t$ treatment group segments, wherein the unsupervised clustering technique takes the plurality of feature sets as input, wherein the first plurality of entities are distributed into the $m_t$ treatment group segments, wherein a particular one of the $m_t$ treatment group segments comprises entities having expressed interest in the particular subject matter category based on their time spent viewing content on the website that is tagged with the particular subject matter tag, and wherein the particular subject matter tag is extracted from uniform resource locators that identify content viewed by entities in the particular treatment group segment;
  determining n control periods, n>1, wherein at least a portion of each of the n control periods occurs before the modified treatment period begins, and wherein each of the n control periods ends before the intervention occurs;
  for each of the n control periods, identifying a candidate control group segment corresponding to each of the $m_t$ treatment group segments, such that each of the n control periods is associated with $m_c$ candidate control group segments, $m_c = m_t$, and such that each of the $m_t$ treatment group segments is associated with n candidate control group segments, wherein each candidate control group segment that includes a second plurality of entities which access the website during the corresponding control period;
  for each of the $m_t$ treatment group segments, using a Wilcoxon Test to select one of the n associated candidate control group segments, wherein the selected control group segment has a distribution of entities that is a closest match with entities in the corresponding treatment group segment;
  determining a metric for analyzing effectiveness of the site-wide action; and
  for each of the $m_t$ treatment group segments, performing a modified difference-in-differences estimation for the metric based on the modified treatment period, the control period associated with the corresponding selected control group segment, and the corresponding selected control group segment.

8. The computer program product of claim 7, wherein the modified treatment period excludes a duration of the intervention of the site-wide action.

9. The computer program product of claim 7, wherein a duration of the modified treatment period is equal to a duration of each of the n control periods.

10. The computer program product of claim 7, wherein, for the particular one of the $m_t$ treatment group segments, the Wilcoxon test considers web browsing behavior similarities between entities in each of the n associated candidate control group segments and entities in the particular one of the $m_t$ treatment group segments.

11. The computer program product of claim 7, wherein the unsupervised clustering technique uses a K-means clustering algorithm with Euclidean distance.

12. The computer program product of claim 7, wherein performing the modified difference-in-differences estimation comprises applying a negative binomial regression model.

13. A system to quantify effectiveness of a site-wide action, the system comprising:
  one or more non-transitory machine readable mediums configured to store instructions; and
  one or more processors configured to execute the instructions stored on the one or more non-transitory machine readable mediums, wherein execution of the instructions causes the one or more processors to
    determine a modified treatment period that surrounds an intervention of a site-wide action affecting a website, the modified treatment period including a pre-intervention time period and a post-intervention time period,
    identify a treatment group that includes a first plurality of entities, at least some of which access the website during the pre-intervention time period and at least some of which access the website during the post-intervention time period,
    segment the treatment group into $m_t$ treatment group segments, $m_t > 1$, by
      defining a plurality of segmentation features, a particular one of which is average time spent viewing content on the website that is tagged with a particular subject matter tag,
      defining a plurality of feature sets, each of which includes one or more of the segmentation features, wherein a particular one of the feature sets defines a particular subject matter category associated with the particular subject matter tag, and
      using an unsupervised clustering technique to generate the $m_t$ treatment group segments, wherein the unsupervised clustering technique takes the plurality of feature sets as input, wherein the first plurality of entities are distributed into the $m_t$ treatment group segments, wherein a particular one of the $m_t$ treatment group segments comprises entities having expressed interest in the particular subject matter category based on their time spent viewing content on the website that is tagged with the particular subject matter tag, and wherein the particular subject matter tag is extracted from uniform resource locators that identify content viewed by entities in the particular treatment group segment, determine n control periods, n>1, wherein at least a portion of each of the n control periods occurs before the modified treatment period begins, and wherein each of the n control periods ends before the intervention occurs, for each of the n control periods, identify a candidate control group segment corresponding to each of the $m_t$ treatment group segments, such that each of the n control periods is associated with $m_c$ candidate control group segments, $m_c = m_t$, and such that each of the $m_t$ treatment group segments is associated with n candidate control group segments, wherein each candidate control group segment includes a second plurality of entities which access the website during the corresponding control period, for each of the $m_t$ treatment group segments, use a Wilcoxon Test to select one of the n associated candidate control group segments, wherein the selected control group segment has a distribution of entities that is a closest match with entities in the corresponding treatment group segment;

determine a metric for analyzing effectiveness of the site-wide action, and for each of the $m_t$ treatment group segments, perform a modified difference-in-differences estimation for the metric based on the modified treatment period, the control period associated with the corresponding selected control group segment, and the corresponding selected control group segment.

14. The system of claim 13, wherein the unsupervised clustering technique uses a K-means clustering algorithm with Euclidean distance.

15. The system of claim 13, wherein the modified treatment period excludes a duration of the intervention of the site-wide action.

16. The system of claim 13, wherein the treatment group is identified by extracting entity identifiers from a log file associated with the website.

17. The system of claim 13, wherein a duration of the modified treatment period is equal to a duration of each of the n control periods.

18. The system of claim 13, wherein, for the particular one of the $m_t$ treatment group segments, the Wilcoxon test considers web browsing behavior similarities between entities in each of the n associated candidate control group segments and entities in the particular one of the $m_t$ treatment group segments.

19. The system of claim 13, wherein performing the modified difference-in-differences estimation comprises applying a negative binomial regression model.

* * * * *